United States Patent
Vlissidis et al.

(10) Patent No.: US 11,886,597 B2
(45) Date of Patent: Jan. 30, 2024

(54) DETECTION OF COMMON PATTERNS IN USER GENERATED CONTENT WITH APPLICATIONS IN FRAUD DETECTION

(71) Applicant: DataVisor, Inc., Mountain View, CA (US)

(72) Inventors: Alexandros Vlissidis, Sunnyvale, CA (US); Nicola Corradi, San Francisco, CA (US); Fang Yu, Sunnyvale, CA (US); Olivia Wang, Fremont, CA (US)

(73) Assignee: Data Visor, Inc., Mountain View, CA (US)

( * ) Notice: Subject to any disclaimer, the term of this patent is extended or adjusted under 35 U.S.C. 154(b) by 549 days.

(21) Appl. No.: 17/074,463

(22) Filed: Oct. 19, 2020

(65) Prior Publication Data

US 2021/0117552 A1 Apr. 22, 2021

Related U.S. Application Data

(60) Provisional application No. 62/916,743, filed on Oct. 17, 2019.

(51) Int. Cl.
*G06F 21/00* (2013.01)
*G06F 21/57* (2013.01)
*G06F 18/23* (2023.01)
*G06F 18/211* (2023.01)
*G06F 18/213* (2023.01)
*G06F 18/20* (2023.01)
*G06F 18/2415* (2023.01)

(52) U.S. Cl.
CPC .......... *G06F 21/577* (2013.01); *G06F 18/211* (2023.01); *G06F 18/213* (2023.01); *G06F 18/23* (2023.01); *G06F 18/2415* (2023.01); *G06F 18/285* (2023.01)

(58) Field of Classification Search
CPC .. G06F 21/577; G06F 18/285; G06F 18/2415; G06F 18/23; G06F 18/213; G06F 18/211
See application file for complete search history.

(56) References Cited

U.S. PATENT DOCUMENTS

| | | | |
|---|---|---|---|
| 9,787,640 B1 | 10/2017 | Xie et al. | |
| 10,009,358 B1 * | 6/2018 | Xie | ........................ G06F 21/552 |
| 10,110,616 B1 | 10/2018 | Xie et al. | |
| 2017/0195356 A1 * | 7/2017 | Turgeman | ............... H04L 63/08 |

OTHER PUBLICATIONS

Zhang et al., "A Word-Character Convolutional Neural Network for Language-Agnostic Twitter Sentiment Analysis," In Proceedings of the 22nd Australasian Document Computing Symposium, Brisbane, QLD, Australia, Dec. 7-8, 2017 (ADCS 2017), 4 pages; https://doi.org/10.1145/3166072.3166082.

* cited by examiner

*Primary Examiner* — Jeffrey C Pwu
*Assistant Examiner* — Thong P Truong
(74) *Attorney, Agent, or Firm* — Fish & Richardson P.C.

(57) ABSTRACT

Methods, systems, and apparatus, including computer programs encoded on computer storage media, for detecting suspicious accounts. One of the methods includes identifying one or more potential clusters of malicious accounts; for each cluster, processing a collection of content associated with each account of the cluster, the processing comprising applying a plurality of models in series to determine whether the collection of content indicates a common pattern; and based on the respective determinations, classifying the accounts of each cluster as ordinary or suspicious.

17 Claims, 8 Drawing Sheets

DETECTION OF COMMON PATTERNS IN USER GENERATED CONTENT WITH APPLICATIONS IN FRAUD DETECTION

CROSS-REFERENCE TO RELATED APPLICATIONS

This application claims the benefit under 35 U.S.C. § 119(e) of the filing date of U.S. Patent Application No. 62/916,743, which was filed on Oct. 17, 2019, and which is incorporated here by reference.

BACKGROUND

Conventional online services typically require end-users to create accounts by inputting content such as name, email, messages, self-introduction, pictures, etc. The content generated by a user while interacting with the platform is unique and has little or no relation with the content generated by other users.

SUMMARY

In the event of a coordinated attack—where a malicious agent controls multiple accounts—directed to an online service, the generation of user content typically has to be made efficient to scale the attack. Such an attacker typically uses scripts to automate the content generation. Even for the most sophisticated attacks where such content is produced by human accomplices, a small number of operators will produce content for all the accounts in a campaign. This will create a pattern that forms a recognizable footprint: their names, emails, nicknames, messages would look more similar than what is generally expected for otherwise unrelated users. Attempts to hide such patterns become more challenging when the fact that the distribution of normal users is typically unknown to the attacker is taken into account. For example, while a large cluster of users using the same email provider is suspicious, some email providers are much more common than others. If the attacker fails to capture the distribution in one of the many latent variables while generating names, messages, nicknames, etc., this discrepancy can be used that to identify the malicious accounts created.

This specification describes ways to detect content generated by attackers. Different from existing solutions that analyze input content individually, e.g., image recognition and classification or language understanding, here the system analyzes a group of content together to decide its suspiciousness.

To detect coordinated malicious users this specification describes systems and methods that use i) an algorithm to identify related accounts and ii) a model able to detect the presence of a common pattern in the content generated by such accounts. An example of the former is provided by DataVisor proprietary fraud ring detection algorithm described in (Xie, Y. and Yu, F., DataVisor, Inc., 2015, Using Hypergraphs to Determine Suspicious User Activities, published as U.S. Pat. No. 9,787,640; and Xie, Y. and Yu, F., DataVisor, Inc., 2015, Using Group Analysis to Determine Suspicious Accounts or Activities, published as U.S. Pat. No. 10,110,616. The foregoing are incorporated here by reference). For the latter a model is trained to detect the pattern shown in the text and content generated by malicious coordinated accounts.

Though a human observer can identify the suspicious pattern in the following group of usernames [3cdacdacasd3, 3csdascd3dsdacsasda3, 3scdass3dasdcas3, 3cadascdascd3, 3scadasdas3, 3dcsdacs3cdsdcasdca3, 3ascdas3scdasdas3, 3cdada3cdasdasd3, 3casda3ascdasdasd3], to formally define what makes it suspicious or to engineer features that would allow a detections system to detect them is a complex task. Deep neural networks can identify such patterns leveraging on abstract, complex representations learned by hierarchically combining simple features, a process that mimics human-like intuition. Deep learning requires a large amount of training data, for example, data gathered by protecting billions of accounts on different platforms, domains, and countries.

Focusing on groups of coordinated accounts has an important advantage: while it's hard to distinguish between malicious users and legitimate outliers on a case by case basis (especially from features like name, email, etc.), finding a common thread between seemingly unrelated users, within the same cluster, provides an accurate method for detecting malicious accounts. Identifying such a pattern for a human observer does not typically require domain knowledge or strong familiarity with the platform. Likewise, the deep learning model described in this specification is able to generalize to new platforms and industries.

DETAILED DESCRIPTION

Figure 1:
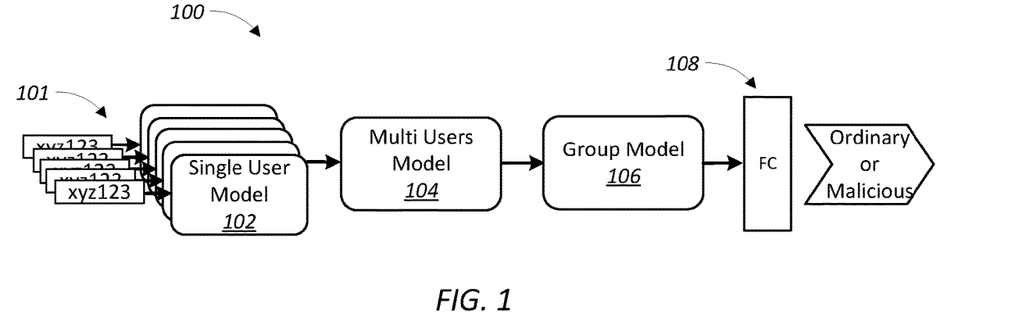
FIG. 1 is a diagram of an example model architecture.

FIG. 1 is a diagram of an example model architecture 100. The model 100 is composed of a combination of three different types of sub-models: a Single-User Model 102, a Multi-Users Model 104, and a Group Model 106. These sub-models are arranged so that they extract, respectively, a high order representation describing the content, the user, and the group.

The Single-User Model 102 processes the content generated by each account individually, without consideration for the context. This model receives the content 101 input by a user, converts each character (or words/group of characters) into a vector representation, and processes them with a shallow one-dimensional Convolutional Neural Network (CNN). The received content includes text or media content input provided by the user, for example, as part of registering or operating an account. For example, the input can include one or more of usernames, emails nicknames, or signatures.

The Single-User Model 102 returns a 2-dimensional (2D) array for each user that provides a more abstracted, higher-order representation of the text. The first dimension of the output array represents the position within the text sequence and the second dimension represents the extracted feature.

The Multi-Users Model 104 generates context-aware embeddings for each user in the group. This model receives the sequences returned by the Single-User Model 102 (stacked in a 3-dimensional (3D) array where the first dimension represents the user) and process them with a two-dimensional CNN. By convolving on the dimensions representing both the content and the users the CNN further abstracts the output of the Single-User Model and introduces context comparing each user to its neighbors, though the system can alternatively ignore the context and limit the convolution to the dimension representing the content. Then the model collapses the array over the sequence dimension carrying, for each feature, the maximum value. The resulting 2D array, containing the user embeddings, is the output of the Multi-Users Model 104.

The Group Model 106 uses attention to determine which users and abstraction levels are the most indicative of the presence of a suspicious pattern in the group. Attention also allows the model to address the lack of an intrinsic order in the cluster. This model receives the users embedding returned by the Multi-Users Model 104 and processes it through a backbone 1-dimensional CNN. In each layer of the CNN, the model uses attention to determine, for each feature, which users are the most relevant and how important is that level of abstraction (i.e., the layer). To optimize for speed, in some implementations, the system applies subset of these operations (e.g., limit the attention to the last layer) while preserving a significant part of the predicting power. The Group Model 106 returns a vector representation (embeddings) for the group, which is used to determine whether or not the group contains a malicious pattern.

Finally, the group embeddings are processed by a fully connected layer 108 whose output is used to determine whether to classify the group (and its account) as ordinary or malicious.

Figure 2:
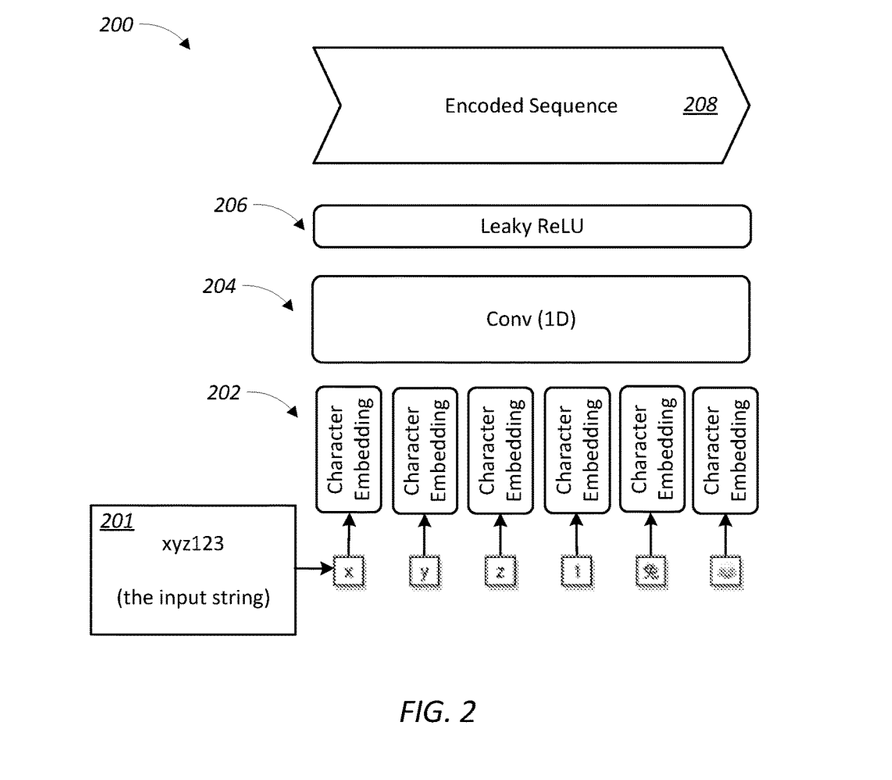
FIG. 2 is a diagram of an example single-user model.

FIG. 2 is a diagram of an example single-user model 200. The Single-User Model 200 receives the textual content 201 inputted by the user (email, name, etc.) and maps each token to a vector representation 202. There are multiple ways to do it, in some implementations the Single-User Model 200 can use a word model, an n-gram model, or a character model. In some implementations, a character-based model is used when the text does not contain words (e.g., email) or different languages are mixed as character-based models are preferable for language-agnostic models (see, e.g., Zhang, S., Zhang, X. and Chan, J., 2017, A word-character convolutional neural network for language-agnostic Twitter sentiment analysis, In Proceedings of the 22nd Australasian Document Computing Symposium. The foregoing is incorporated here by reference).

Figure 3:
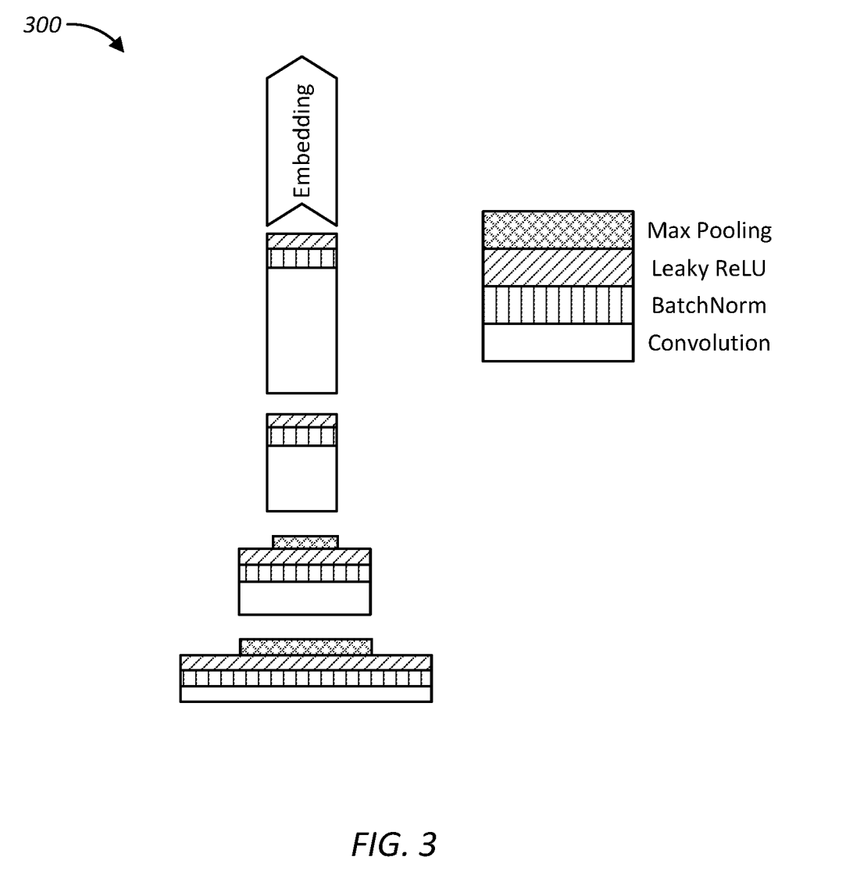
FIG. 3 is a diagram of an example glyph model.

For the character model the system can use two alternative strategies to map each character to a vector representation, depending on the number of unique characters, the alphabet(s) used, and the prevalence of emojis and emoticons. If the number of unique characters is small the simplest solution is to learn a vector representation for each character. However, when the number of characters is very large (e.g., Unicode 6.0 defines 109,384 characters) learning a distinct vector representation for each character can be challenging and computationally costly. The corpus available to learn such representations is also limited since the meaning of a character can vary depending on the platform (e.g., a heart emoji in the username can be common on some dating apps, but it would be very unusual on news aggregators). However, the meaning of an unknown or rare character can be guessed from the meaning of similar known characters; this is especially true for emoji, Chinese characters (when they are composed of known radicals), and punctuations (e.g., when used for emoticons). The system leverages this by first rendering each character as an image and feeding it to a CNN (the Glyph Model 300 illustrated in FIG. 3) that returns a vector representation. The Glyph Model is trained to generate the representations that are the most useful to identify clusters of malicious users.

After the sequence of characters (or words/n-grams) is converted to a 2D array—where a dimension represents their position in the string and another dimension represents the features encoded in the vector representation—that is passed to a one-dimensional convolutional layer 204. The convolution is performed on the dimension corresponding to the sequence and the model applies a nonlinear transformation 206 (e.g., using a Leaky rectified linear unit (ReLU) to its output. The Single-User Model 200 returns this encoded representation of the text 208.

Figure 4:
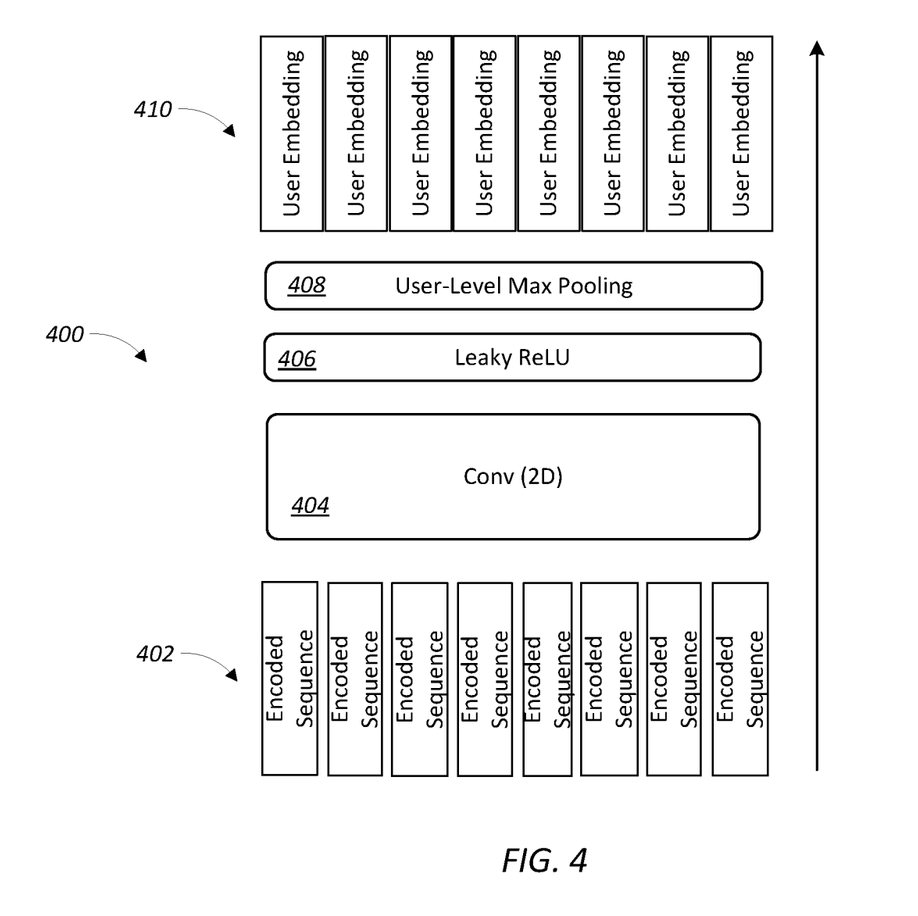
FIG. 4 is a diagram of an example multi-users model.

FIG. 4 is a diagram of an example Multi-Users Model 400. The Multi-Users Model 400 receives the encoded sequences generated by the Single-User Model (e.g., Single-User Model 200), which processed, for each user, the inputted text. The sequences are combined into an array 402 where one dimension represents the user, one dimension represents the sequence, and one dimension represents the features (or channels) extracted in the previous steps. A 2D convolution 404 is applied to the dimensions representing the sequence and users. This allows the model to extract from the sequence a higher-order representation that includes the context (i.e., the neighboring users). To simplify the network (e.g., to increase the inference speed) it is also possible to ignore the context and perform a 1D convolution instead.

The output of the 2D convolution is then passed to a nonlinearity (Leaky ReLU) 406. To generate the User Embeddings 410 the model collapses the sequence dimension applying a max-pooling operation 408. In detail, for each user the model 400 creates a vector where for each feature the model selects the maximum value encountered over their entire sequence. The output of the Multi-Users Model 400 is a two-dimensional array where one dimension represents the users and another dimension represents the features.

Figure 5:
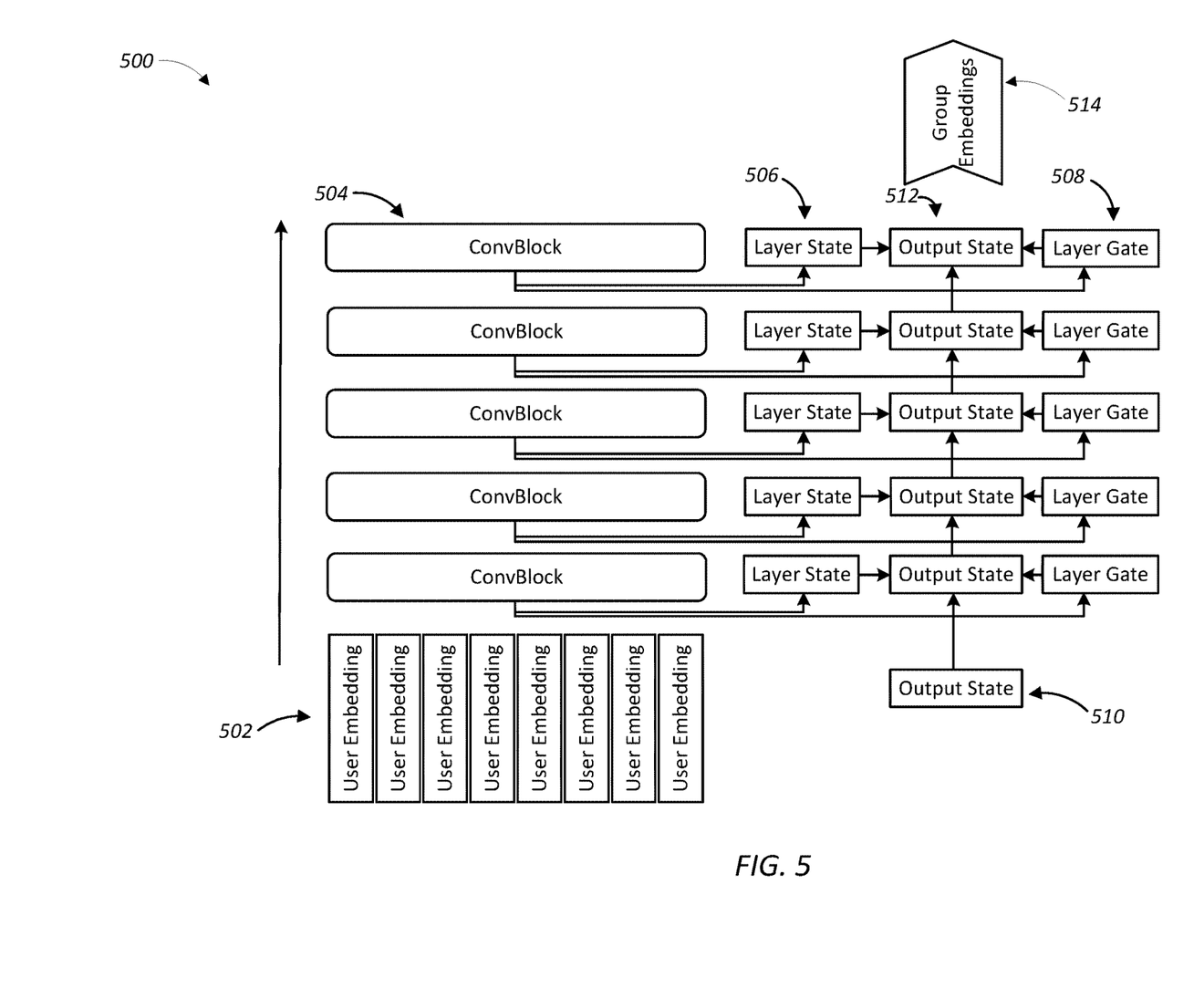
FIG. 5 is a diagram of an example group model.

FIG. 5 is a diagram of an example group model 500. The Group Model 500 receives the stacked User Embeddings 502 output from the Multi-Users Model, e.g., Multi-Users Model 400, which are then processed by an encoder that includes a number of stacked convolutional blocks (Conv-Blocks) 504. For each layer of convolutional blocks, the model calculates a Layer State vector 506 and a Layer Gate vector 508, though to reduce the complexity of the model, in some implementations the model uses a subset of the operations described. Starting from the lowest order layer, the model updates the Output State 510 combining it with the corresponding Layer State 506. For each feature, the corresponding Layer Gate value will determine how much the Layer State will contribute and how much the result calculated on earlier layers will carry over. In other words, the gate vector will determine how much the current level of abstraction should override the state calculated according to the lower order layers. Thus on the layer i for the feature j the value of the Output State will be $O_{i,j}=L_{i,j}G_{i,j}+O_{i-1,j}(1-G_{i,j})$. The Group Model returns the final Output State 512, which gives us the embedding 512 for the group.

Figure 6:
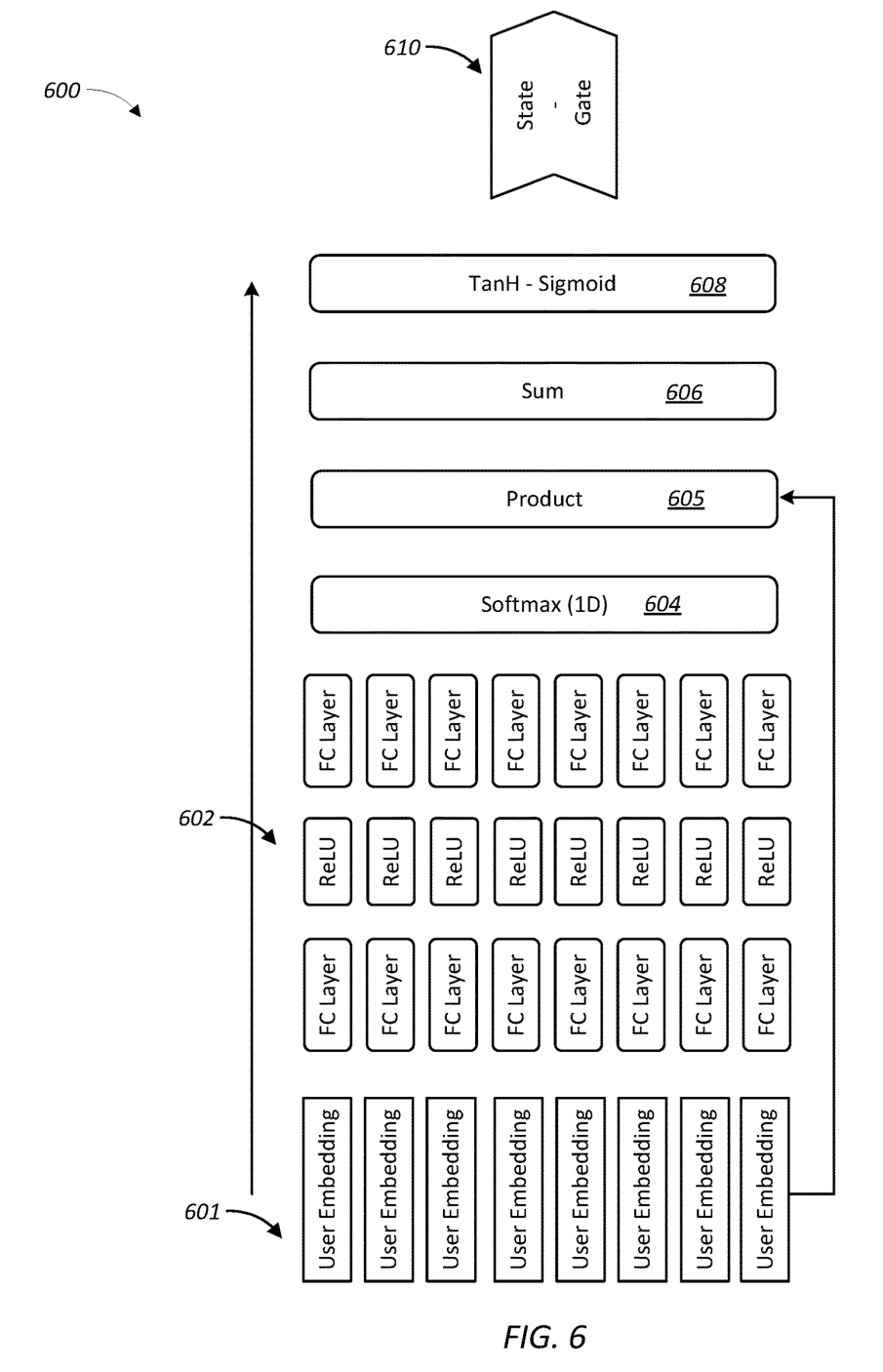
FIG. 6 is a diagram of an example process flow to calculate a layer state or layer gate.

FIG. 6 is a diagram 600 of an example process flow to calculate a layer state or layer gate The Layer State and the Layer Gate 610 are calculated from the output of the corresponding ConvBlock; the attention function that will determine—for each feature—how much each user is relevant. In detail, the system applies a shallow Neural Network (NN) 602 to each user embedding 601—each user is processed independently from the others. The Group Model uses a different NN for the Layer State and Layer Gate, and the same MLP for all the layers. For each feature, the NN will generate a weight that will reflect how relevant the user is for that feature. Then for each feature a softmax 604 is applied across the weights assigned to the users converting such weights to attention scores. In the product layer 605, the values of each user embedding 601 are multiplied by the corresponding attention score 604. The sum layer 606 collapses the output of the ConvBlock to a vector summing the values across all the users 606. For the Layer State a nonlinear function is applied 608 to its vector. For the Layer Gate a sigmoid function is applied 608 to the values of its vector.

Figure 7:
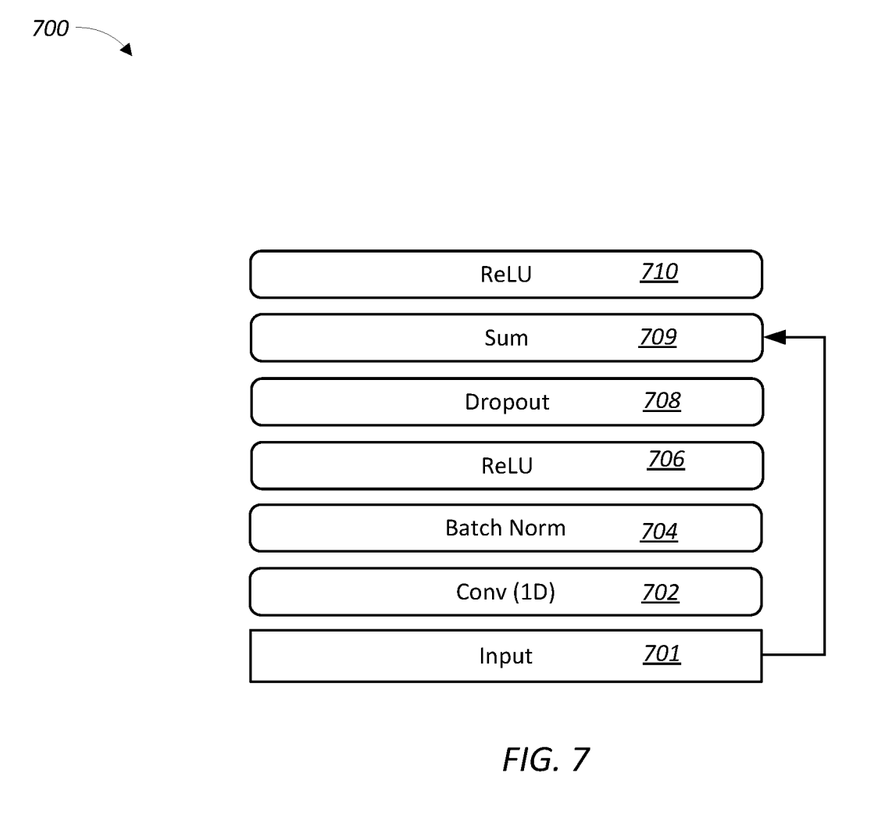
FIG. 7 is a diagram of an example convolutional block.

FIG. 7 is a diagram 700 of an example convolutional block. Each ConvBlock includes a stack of layers including a 1D convolution 702, Batch Normalization 704, ReLU 706, Dropout 708, and ReLU 710 layers. The 1D convolution 702 is applied over the dimension that represents the users in the group, where the input 701 is the user embedding output from the Multi-Users Model. Batch Normalization 704 and Dropout 708 are regularization layers that help to prevent overfitting. ReLU 706, 710 are non-linear operations applied after the previous linear transformations that allow the modeling of non-linear functions. Sum 709 adds Dropout 708 to the input 701, thus creating a residual connection that helps with the backpropagation by creating a gradient shortcut to the previous layers.

Figure 8:
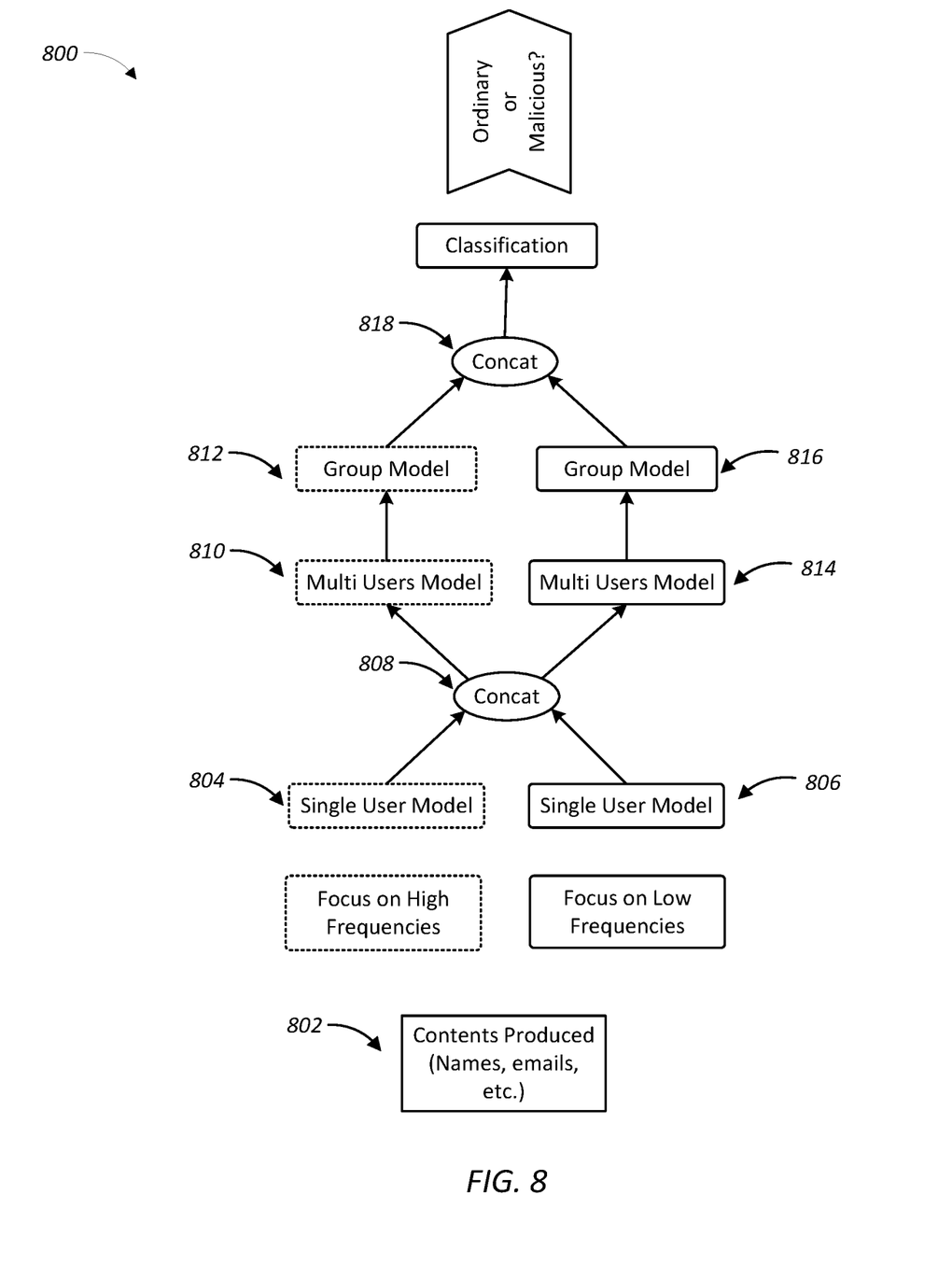
FIG. 8 is a diagram of an example system architecture.

FIG. 8 is a diagram 800 of an example system architecture for organizing the above described sub-models as part of a fraud detection system. There are multiple ways to organize the sub-models and diagram 800 shows one possible architecture. In some instances, the illustrated architecture can be reduced to simplify the computations. As shown in diagram 800, the detection system uses two versions of each sub-model by choosing their kernel size so that one would focus on, for example, short-range connections and the other would focus on long-range connections. In another example shown, one version can focus on high frequencies while the other would focus on low frequencies. In this example high frequency means looking at characters within a narrow window (i.e., looking at only 3 or 4) versus low frequency where you look at a larger window of maybe 5 or the whole input even, to generate the output. When the system receives the content generated by the users 802, the detection system passes it to the two Single-User Models 804 and 806, one focused on high frequencies and the other focused on low frequencies. The system concatenates 808 the output of the two models in one sequence, stacking them on the dimension representing the characters in the text.

The system then processes this array with a Multi-User Model 810 and the Group Model 812 dedicated to short connections; then the system processes it again using the version of the Multi-User Model 814 and the Group Model 816 dedicated to longer connections. The system obtains two embeddings for the group as output from the respective group models, one generated while focusing on the short connections and the other generated while focusing on the longer connections.

The system can then concatenate 818 the output of the two group models to stack them into a single vector, which is used to determine the presence of a suspicious pattern in the group. The determination is done by a classification layer 820 that includes a fully connected layer followed by a softmax function.

For instance, clusters of users based on IP, device, etc., shouldn't have any pattern in the usernames. However, the model is able to recognize the pattern, for example, in the following malicious groups: "Share Tips Vips; Resource For Individuals; Entertainment Scene Vips; Choosing A Destination; Experienced women; Highestlevelvips; Greater Opportunities Tips; Workout Gear; Resource In Households; Colorful Photos Vips; Right Attention Tips" [not a proper name/suggestive], "Epicureans Club; Epicureans Time; Epicureans Wine; Students Oftheworld; Epicureans Life; Friends Choices; Epicureans Taste; Epicureans Smoke; Epicureans Finance; Epicureans Home; Epicureans Trip; Epicureans Spirit; Little Epicureans; Epicureans Style; Students Dome" [not a proper name/recreational], "Stanislavrnq; Yaroslavewn; Romanbesu; Nikitabykovqsc; Aleksandrkxro; Leonidhkul; Vyacheslavtbi; Egorgdkbl; Fedornar; Vyacheslaysxbh; Petrzkarpov; Artemgiand; Mikhailabrla; Ruslanqcdv; Leonidkhoquh; Fedorbonblinov; Arturgs; Antonkmarkov; Vbelovybt; Dmitriyvort; Aleksandrbpm; Vadimodbgurev; Pavelngnign; Leonidfc; Boristidh; Yuriyoullar; Ruslanuqnkal; Artyomkj c; Andreywel; Vladimirfik; Tankovaeliana; Gennadiynzgr; Nikolayabsip; Artemnesptu; Maksimbyk; Ulia; Igorvpo; Geefimovqotw; Romanoddmo; Ruslanko; Sergeynp; Sergeydpdj; Vladimirdla; Dimakufb; Alenwahshubin; Anjelahramova; Stepankpk; Ivanrxg; Vladimirami" [missing lastname/first name often followed by random characters in an attempt to thwart detection].

If a suspicious pattern is identified by the model, additional actions can be taken by the system including, for example, flagging the corresponding accounts for further review, suspending the accounts, blocking the accounts, etc.

Application in a Fraud-Detection System

A fraud-detection system can leverage the key insight that fraudsters need to work at scale to make their practice economically viable: they create an army of fake accounts, often through some prewritten script (sometimes using a device farm), to conduct attacks. Such resources (e.g., devices, IP addresses, etc.) are expensive, so an attacker will have to re-use such resources across multiple accounts to make such attack profitable. Therefore, the detection system can use a clustering algorithm to clusters users that correlate across many characteristics such as IP address, device, user agent, etc. However, some of these clusters may contain legitimate users, as people can share an internet connection, browser, and combination of such for legitimate reasons or by chance. In this case, as these are normal user accounts, there is little or no relationship between the users, therefore the content generated by such accounts will be uncorrelated. Conversely, if the accounts are part of the same malicious campaign we will often observe a pattern in the user-generated content. Such correlations can be used to identify coordinated malicious clusters as distinct from normal user accounts.

A large corpus of malicious clusters can be accumulated from a large number of online service providers. The detection system described above has is able to learn to recognize suspicious patterns from historical data and to generalize to new online service providers and domains.

There are few ways we use such a model. If there is enough (labelled) data from the application (use case) where the model is to be applied, the simplest approach would be to collect historical bad data to train the model and use it to identify suspicious patterns on future events. The labeled data can be provided by the application, or generated automatically, e.g., using a fraud ring detection algorithm such as described in Xie, Y. and Yu, F., DataVisor, Inc., 2015, Using hypergraphs to determine suspicious user activities, published as U.S. Pat. No. 9,787,640; and Xie, Y. and Yu, F., DataVisor, Inc., 2015, Using group analysis to determine suspicious accounts or activities, published as U.S. Pat. No. 10,110,616. Each of which is incorporated here by reference.

Figure 9:
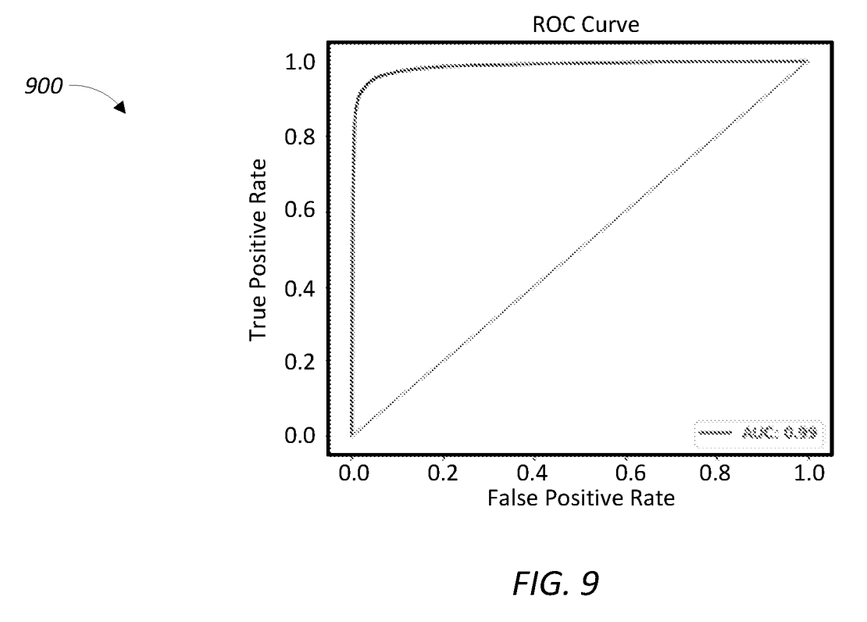
FIG. 9 is a chart showing an example Receiver Operating Characteristic (ROC) curve describing the performance of the model four months after training.

Empirical tests show that the neural network learns to identify malicious users, and that the performance remains stable over time, as illustrated by Receiver Operating Characteristic (ROC) curve 900 shown in FIG. 9. It is worth noting that this approach is very different from traditional supervised machine learning approach where individual content is analyzed. In those scenarios, the model is trained to remember the bad content. Here, the deep learning model is trained to learn the structure of a group of content to identify patterns indicative of malicious activity, but not the content itself. Therefore, the model doesn't decay quickly and can be applied to future data and maintain high performance.

Figure 10:
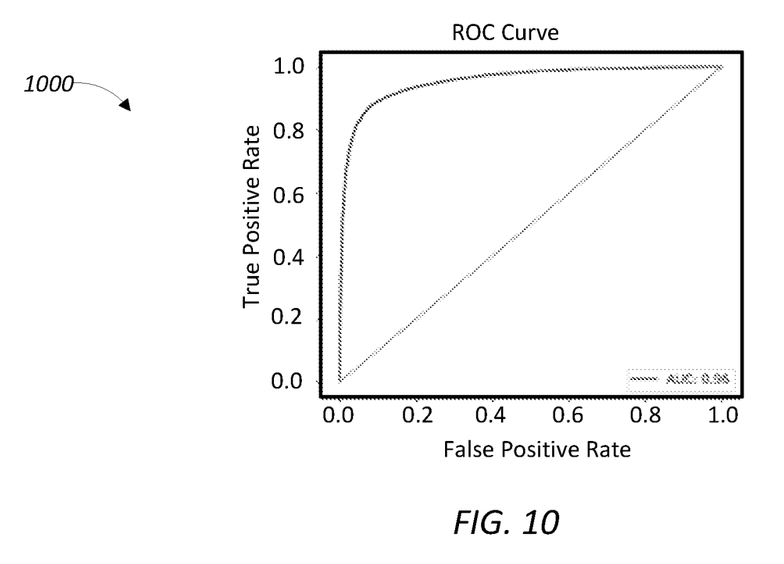
FIG. 10 is a chart showing an example ROC curve describing the performance of a model, trained on a first use case and applied to a second use case.

The downside of this approach is that it requires created labels and training the model for each use case, thus making harder to scale to a large number of independent use cases. An alternative is to train the model using labelled data gathered on several use cases and to use it on new platforms where labelled data is not available. The high area under curve (AUC) shows that a model trained with this method can generalize to new use case, as illustrated by ROC curve 1000 shown in FIG. 10.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following embodiments are also innovative:

Embodiment 1 is a method comprising identifying one or more potential clusters of malicious accounts; for each cluster, processing a collection of content associated with each account of the cluster, the processing comprising applying a plurality of models in series to determine whether the collection of content indicates a common pattern; and based on the respective determinations, classifying the accounts of each cluster as ordinary or suspicious.

Embodiment 2 is the method of embodiment 1 wherein applying the plurality of models in series comprises: applying a single-user model to the collection of content; applying a multi-users model to the output of the single-user model; and applying a group model to the output of the multi-users model.

Embodiment 3 is the method of any one of embodiments 1 through 2, wherein the single-user model outputs a sequence containing features extracted from the content produced by one user account.

Embodiment 4 is the method of any one of embodiments 1 through 3, wherein the multi-users model converts the output sequence of the single-user model generate for each user of the cluster into context-aware embedding describing the content generated by each user account.

Embodiment 5 is the method of any one of embodiments 1 through 4, wherein the group model uses the content-aware embedding to extract suspicious patterns within the group to determine whether the cluster of accounts is suspicious.

Embodiment 6 is the method of any one of embodiments 1 through 5, wherein the group model uses attention to identify common threads shared by multiple user accounts in an unordered cluster of accounts.

Embodiment 7 is the method of any one of embodiments 1 through 6, wherein the single-user model processes each character of content for an account individually including non-linguistic content.

Embodiment 8 is the method of any one of embodiments 1 through 7, wherein graphical non-linguistic characters are mapped to a vector representation based on visual features.

Embodiment 9 is the method of any one of embodiments 1 through 8, wherein determining a common pattern can include one or more of determining a pattern of randomness suggesting content generated automatically by scripts or determining a pattern of content structures indicating the content is generated by scripts.

Embodiment 10 is a fraud detection system comprising: one or more computers and one or more storage devices storing instructions that are operable, when executed by the one or more computers, to cause the one or more computers to perform the method of any one of embodiments 1-9.

Embodiment 11 is one or more non-transitory computer storage media encoded with computer program instructions that when executed by one or more computers cause the one or more computers to perform method of any one of embodiments 1-9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   identifying one or more potential clusters of malicious accounts;
   for each cluster, processing a collection of content associated with each account of the cluster, the processing comprising applying a plurality of models in series to determine whether the collection of content indicates a common pattern, the applying the plurality of models in series comprising:
   applying a plurality of instances of a single user model to respective portions of the collection of content, applying a multi-users model to the output of the plurality of instances of the single user model, and applying a group model to the output of the multi-users model; and based on the respective determinations, classifying the accounts of each cluster as either ordinary or suspicious.

2. The method of claim 1, wherein the single-user model outputs a sequence containing features extracted from the content produced by one user account.

3. The method of claim 2, wherein the multi-users model converts the output sequence of the single-user model generate for each user of the cluster into context-aware embedding describing the content generated by each user account.

4. The method of claim 3, wherein the group model uses the content-aware embedding to extract suspicious patterns within the group to determine whether the cluster of accounts is suspicious.

5. The method of claim 4, wherein the group model uses attention to identify common threads shared by multiple user accounts in an unordered cluster of accounts.

6. The method of claim 2, wherein the single-user model processes each character of content for an account individually including non-linguistic content.

7. The method of claim 2, wherein graphical non-linguistic characters are mapped to a vector representation based on visual features.

8. The method of claim 1, wherein determining a common pattern includes one or more of determining a pattern of randomness suggesting content generated automatically by scripts or determining a pattern of content structures indicating the content is generated by scripts.

9. A fraud detection system comprising:
one or more computers and one or more storage devices storing instructions that are operable, when executed by the one or more computers, to cause the one or more computers to perform operations comprising:
identifying one or more potential clusters of malicious accounts;
for each cluster, processing a collection of content associated with each account of the cluster, the processing comprising applying a plurality of models in series to determine whether the collection of content indicates a common pattern, the applying the plurality of models in series comprising:
applying a plurality of instances of a single user model to respective portions of the collection of content,
applying a multi-users model to the output of the plurality of instances of the single user model, and
applying a group model to the output of the multi-users model; and
based on the respective determinations, classifying the accounts of each cluster as either ordinary or suspicious.

10. The system of claim 9, wherein the single-user model outputs a sequence containing features extracted from the content produced by one user account.

11. The system of claim 10, wherein the multi-users model converts the output sequence of the single-user model generate for each user of the cluster into context-aware embedding describing the content generated by each user account.

12. The system of claim 11, wherein the group model uses the content-aware embedding to extract suspicious patterns within the group to determine whether the cluster of accounts is suspicious.

13. The system of claim 12, wherein the group model uses attention to identify common threads shared by multiple user accounts in an unordered cluster of accounts.

14. The system of claim 10, wherein the single-user model processes each character of content for an account individually including non-linguistic content.

15. The system of claim 10, wherein graphical non-linguistic characters are mapped to a vector representation based on visual features.

16. The system of claim 9, wherein determining a common pattern includes one or more of determining a pattern of randomness suggesting content generated automatically by scripts or determining a pattern of content structures indicating the content is generated by scripts.

17. One or more non-transitory computer storage media encoded with computer program instructions that when executed by one or more computers cause the one or more computers to perform operations comprising:
identifying one or more potential clusters of malicious accounts;
for each cluster, processing a collection of content associated with each account of the cluster, the processing comprising applying a plurality of models in series to determine whether the collection of content indicates a common pattern, the applying the plurality of models in series comprising:
applying a plurality of instances of a single user model to respective portions of the collection of content,
applying a multi-users model to the output of the plurality of instances of the single user model, and
applying a group model to the output of the multi-users model; and
based on the respective determinations, classifying the accounts of each cluster as either ordinary or suspicious.

* * * * *

UNITED STATES PATENT AND TRADEMARK OFFICE
CERTIFICATE OF CORRECTION

PATENT NO. : 11,886,597 B2
APPLICATION NO. : 17/074463
DATED : January 30, 2024
INVENTOR(S) : Alexandros Vlissidis et al.

It is certified that error appears in the above-identified patent and that said Letters Patent is hereby corrected as shown below:

On the Title Page

Column 1, Item (73) Assignee: Please replace "Data Visor, Inc., Mountain View, CA (US)" with --DataVisor, Inc., Mountain View, CA (US)--, therefor.

Signed and Sealed this
Twenty-sixth Day of March, 2024

Katherine Kelly Vidal
*Director of the United States Patent and Trademark Office*